United States Patent
Minov et al.

(10) Patent No.: US 9,501,293 B2
(45) Date of Patent: Nov. 22, 2016

(54) AUTOMATIC CONTEXT PASSING DURING MANAGEMENT APPLICATION NAVIGATION

(75) Inventors: Jasen Minov, Sofia (BG); Stanimir Eisner, Russe (BG)

(73) Assignee: SAP SE, Walldorf (DE)

( * ) Notice: Subject to any disclaimer, the term of this patent is extended or adjusted under 35 U.S.C. 154(b) by 998 days.

(21) Appl. No.: 12/849,026

(22) Filed: Aug. 3, 2010

(65) Prior Publication Data

US 2012/0036458 A1   Feb. 9, 2012

(51) Int. Cl.
 *G06F 3/048* (2013.01)
 *G06F 3/00* (2006.01)
 *G06F 9/44* (2006.01)

(52) U.S. Cl.
 CPC .................................. *G06F 9/4443* (2013.01)

(58) Field of Classification Search
 USPC ........................................ 715/810, 764, 754
 See application file for complete search history.

(56) References Cited

U.S. PATENT DOCUMENTS

| | | | |
|---|---|---|---|
| 2005/0075115 A1* | 4/2005 | Corneille et al. | 455/456.3 |
| 2007/0011618 A1* | 1/2007 | Maron | 715/749 |
| 2008/0065993 A1* | 3/2008 | Huang | 715/745 |
| 2011/0153465 A1* | 6/2011 | Pombo et al. | 705/27.1 |

* cited by examiner

*Primary Examiner* — Amy Ng
*Assistant Examiner* — Erik Stitt (57) ABSTRACT

Various embodiments of systems and methods for automatic context passing during management application navigation are described herein. When management applications work with different managed entities, the managed context is preserved by following the relations between the managed entities. These relations are followed from a mediator framework during the navigation between the management applications. In this manner, a managed application passes context information for one entity type, and second managed application retrieves from the framework context information for different entity type, but the user context information will be preserved as the framework follows the relations between the passed entity and the requested entity types.

18 Claims, 5 Drawing Sheets

| START & STOP: JAVA APPLICATIONS | | | | PERSONALIZE ▲ |
|---|---|---|---|---|
| FAVOURITES ▲ | RELATED LINKS ▲ | GO TO ▲ | | |
| JAVA INSTANCES / JAVA SERVICES / JAVA APPLICATIONS | | | | |
| APPLICATION LIST | | | | |
| RETRIEVE STATUS: ON ▼ | START ▲ | STOP ▲ | RESTART | RELATED TASKS ▲ |
| | | | VIEW LOGS | |
| | | | VIEW APPLICATION COMPONENT INFO 420 | |
| | | | VIEW APPLICATION PROPERTIES | |
| | | | VIEW RELATED FUNCTIONALITY | |

| | NAME | | STATUS |
|---|---|---|---|
| ⊞ | TC~IM~ITSAM~UI~PROXY | | ☐ STARTED |
| | TC~IM~ITSAM~UI~SESSION~API  415 | SAP.COM | ☐ STARTED |
| | TC~IM~ITSAM~UI~SYSSEL~TREE~WD | SAP.COM | ☐ STARTED |

DEVELOPMENT COMPONENTS OF SCA LMNWAUIFRMRK

DISPLAY: PER SELECTED SOFTWARE COMPONENT ▼ | EXPORT TO EXCEL

| | VENDOR | NAME | VERSION | CHANGE NUMBER |
|---|---|---|---|---|
| ⊞ | SAP.COM | TC~IM~ITSAM~UI~SESSION~API  455 | 7.3000.20100113192507.000 | 431 |
| | SAP.COM | TC~IM~WEBADMIN~MAINFRAME~WD | 7.3000.20100113192507.000 | 431 |
| | SAP.COM | TC~IM~ITSAM~CO~UI~NWA~LOCALNAVIGATION~WD | 7.3000.20100113192507.000 | 431 |

AUTOMATIC CONTEXT PASSING DURING MANAGEMENT APPLICATION NAVIGATION

FIELD

The field relates to computer application management. More precisely, the field relates to context passing during navigation between management applications.

BACKGROUND

There are various administration tools for managing complex computer applications. Some of these tools are realized as an aggregate of many distinct management applications. These management applications can also be called plug-ins or modules. Each management application offers a visual interface for management of some dedicated scope of a complex computer application. For example a user utilizes a first management application to monitor a complex computer application, a second management application to configure a complex computer application, a third management application to administer a complex computer application, a forth management application to diagnose a complex computer application, etc.

Usually, at any point of time, only one of these management applications is visible to the user. A common user scenario for working with an aggregated administration tool includes managing entities within several management applications. An entity, in the context of a management application, is a part of the system that is managed utilizing the management application. For example an entity may be a service or an application, and the user may use one management application to start the application and another management application to view the logs for the same application. During the navigation between the management applications it can be desirable to keep information for the selected managed entities. For example, there is usually a special framework between the administration tool and the management applications that is used for keeping the managed entities. Before exiting, a management application passes the managed entities context information to the framework. When a navigation target management application is started, it can read entity information from the framework. The framework thus serves as a mediator between the management applications.

The context passing mechanism described above works adequately when the management applications use the same managed entities. However, when management applications work with different managed entities, the managed context will be lost. This loss prevents users from building complex management scenarios using this basic framework mediator approach.

SUMMARY

Various embodiments of systems and methods for automatic context passing during management application navigation are described herein. In one embodiment, the method includes receiving a user action to navigate to a second management application from a first management application and collecting one or more managed entities the user works with in the first management application. The method also includes retrieving one or more related entities to the one or more managed entities to populate a managed entity context as well as retrieving one or more context entities from the managed entity context, the one or more context entities recognizable by the second management application. The method further includes applying the retrieved one or more context entities in the second management application.

In another embodiment, the system includes a first and a second management applications, one or more managed entities a user works with in the first management application, and one or more related entities to the one or more managed entities. The system further includes a selector module to define the one or more related entities to the one or more managed entities in the first management application to populate a managed entity context and an extractor module to retrieve one or more context entities from the managed entity context, the one or more context entities recognizable by the second management application.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for automatic context passing during management application navigation are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
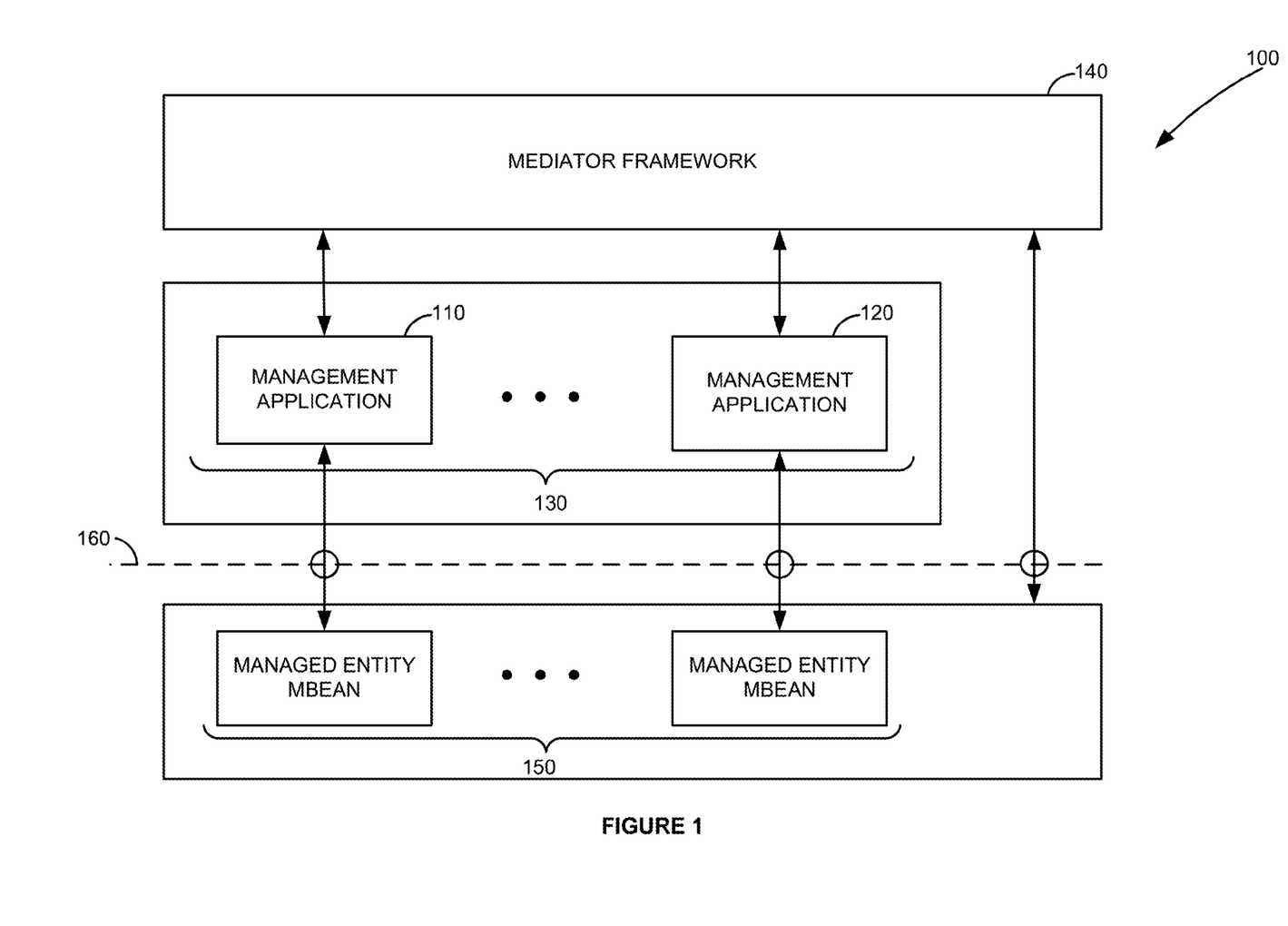
FIG. 1 is a block diagram of an embodiment of a system for automatic context passing during management application navigation.

FIG. 1 is a block diagram of an embodiment of a system 100 for automatic context passing during management application navigation. The system 100 includes a set of management applications 130. The set of management applications 130 are modules with certain functionalities within a complex management tool. Each management application from the set of management applications 130 is used for managing some type of entities or some aspects of the entities. An entity within a management application is a part of the system that is managed utilizing the management application. For example an entity may be a service or an application, and the user may use one management application to start the application and another management application to view the logs for the same application.

Managing aspects of an entity can include managing various properties or attributes of the entity. Entity properties or attributes can be organized according to their related functionality so that the different management applications 130 can easily manipulate specific types of functionalities of entities.

A common user scenario includes management of entities using different management applications 130. While multiple management applications 130 are often used in a given user scenario, at any point of time, only one of the management applications 130 can be actively used for management. As a result, navigation between the management applications 130 is required and information for the managed entities is kept.

When using a management application, only the inherent entities and aspects of the entities associated with that application are managed. The inherent entities and aspects of the entities for an application are these entities and aspects of the entities manageable by the application. For instance, a user of a management application may navigate from a first management application 110 to a target management application 120 according to a user scenario. If management applications 110 and 120 use the same managed entities, then before the first management application exits, the first management application 110 can send managed entities information to a mediator framework 140. The target management application 120 can then read the managed entities information from the mediator framework 140 and perform further management activities on the managed entities.

In a more complex scenario in which management applications 110 and 120 use different managed entities, the managed context is lost during the navigation between management application 110 and management application 120 because the target management application 120 does not recognize the managed entities from the first management application 110. Various embodiments can address this problem by not only storing information for the managed entities in the mediator framework 140, but by also storing information for entities related to the managed entities in the mediator framework 140.

In one specific embodiment, the management applications 130 perform their management activities by means of Java Management Extensions (JMX) 160. JMX is a Java technology that supplies tools for managing and monitoring applications, system objects, devices (e.g. printers) and service oriented networks. These resources are represented by objects called MBeans (for Managed Bean). An MBean represents a resource running in the Java virtual machine, such as an application or a Java EE technical service. The MBeans can be used for getting and setting applications configuration, for collecting statistics (e.g. performance, resources usage, problems) and notifying events (e.g. faults, state changes).

Turning back to the embodiment illustrated in FIG. 1, the management applications 130 operate on Managed Entity MBeans 150 by means of JMX 160. These Managed Entity MBeans 150 represent the managed aspects of the entities. The MBeans 150 expose different attributes and operations applicable for the entity. Part of the exposed information of an MBean is the relations to other entities. In one embodiment, this relation information is used by the mediator framework 140 to discover related entities during navigation between management applications 130. By following these relations, the managed context can be preserved even when the first management application 110 and the second management application 120 utilize different managed entities. The target management application 120 may read from the mediator framework 140 not only the managed entities utilized by the first management application 110 but also the related entities to the managed entities following the relations provided by the Managed Entity MBeans 150. For example, if a user observes an entity being, for instance, some kind of an application or a service within a management application and the status of the entity is "FAILED", then the user may be interested in seeing the logs for the same entity. The logs are available in a second management application, and when loading the second management application, instead of searching the failed application or service (entity) by name, the user expects to see the filtered logs for the entity selected in the first management application. Thus the managed context is preserved while navigating between the management applications. Other specific examples for preserving managed context information will be given in more detail below.

Figure 2:
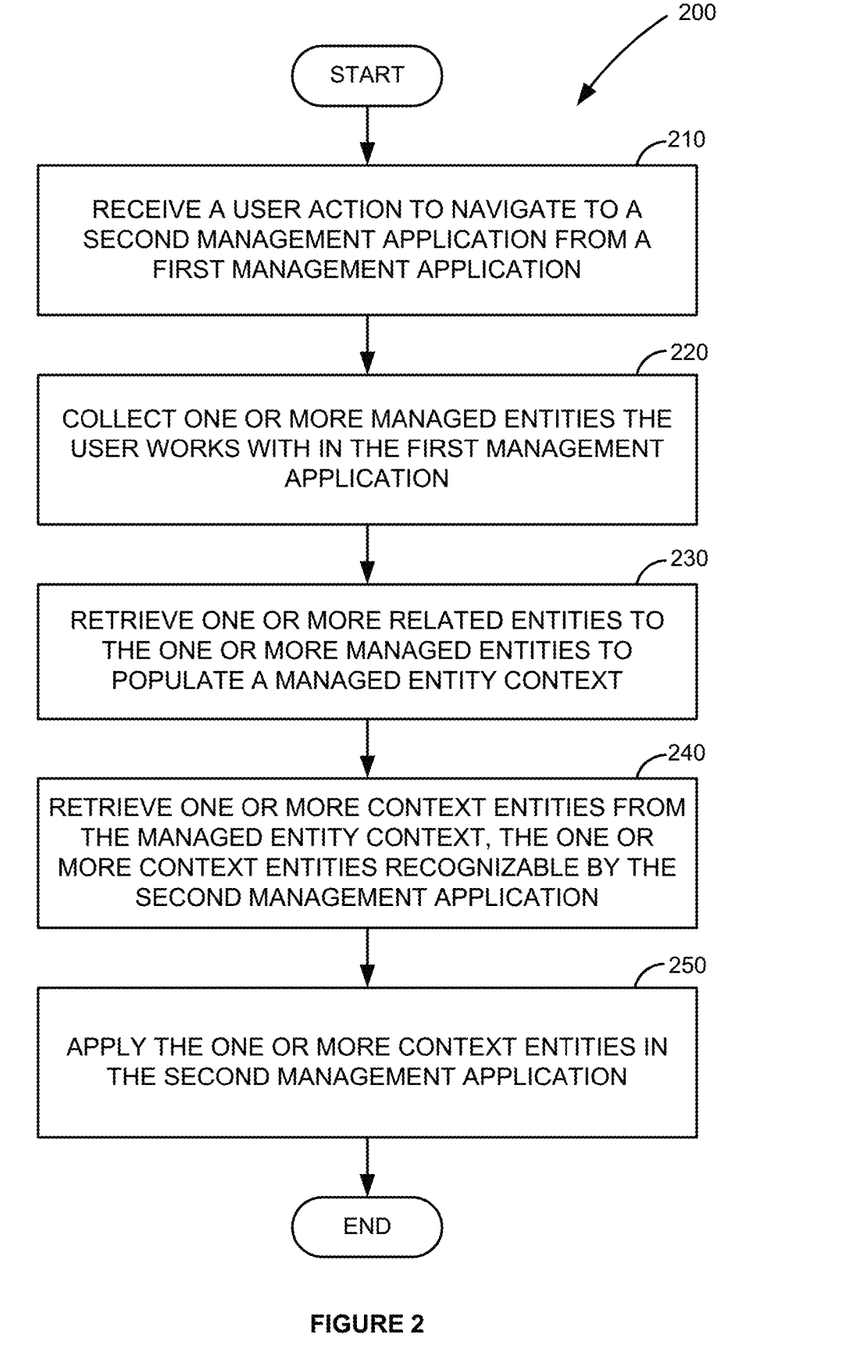
FIG. 2 is a flow diagram of an embodiment of a method for automatic context passing during management application navigation with functionality to follow relations between different managed entities.

FIG. 2 is a flow diagram 200 of an embodiment of a method for automatic context passing during management application navigation with functionality to follow relations between different managed entities.

The method starts at block 210 with receiving a user action to navigate to a second management application from a first management application. The navigation is required because different management applications operate on different entities and aspects of the entities. As a result, switching between management applications is a typical management scenario. The navigation to the second management application may be invoked, in one embodiment, by following a link in the first management application leading to the second management application. In another embodiment, the navigation is performed by exiting the first management application, followed by loading the second management application.

At block 220, one or more managed entities a user works with in the first management application are collected. In one embodiment, all of the MBeans that are managed by the first management application are identified.

At block 230, one or more related entities to the one or more managed entities are retrieved. These retrieved entities can populate a managed entity context. In one embodiment, the retrieving of the related entities is done by following entity relations. In one embodiment the entity relations may be registered from special MBeans. These MBeans should have a special attribute showing what relations they introduce and methods that could be used to follow a particular relation. In one embodiment, the entity relations are added at runtime. For example, in a complex computer application having a number of management applications to manage different aspects of the complex computer application, some of the entity relations may not be hard-coded because of the dynamics of the complex computer application, which requires support of adding relations in runtime by specific Application Programming Interfaces (APIs).

At block 240, one or more context entities recognizable by the second management application are retrieved from the managed entity context. According to one embodiment, entities recognizable by a management application are entities that are managed utilizing selfsame management application.

Finally, at block 250, the retrieved one or more context entities are applied in the second management application. In one embodiment, the method further includes displaying the applied one or more context entities in the second management application. For example, a user operates on an entity by means of a first management application and the logs of the entity being managed by the first management application are retrieved and displayed in a second management application, the second management application designated to show logs.

Figure 3:
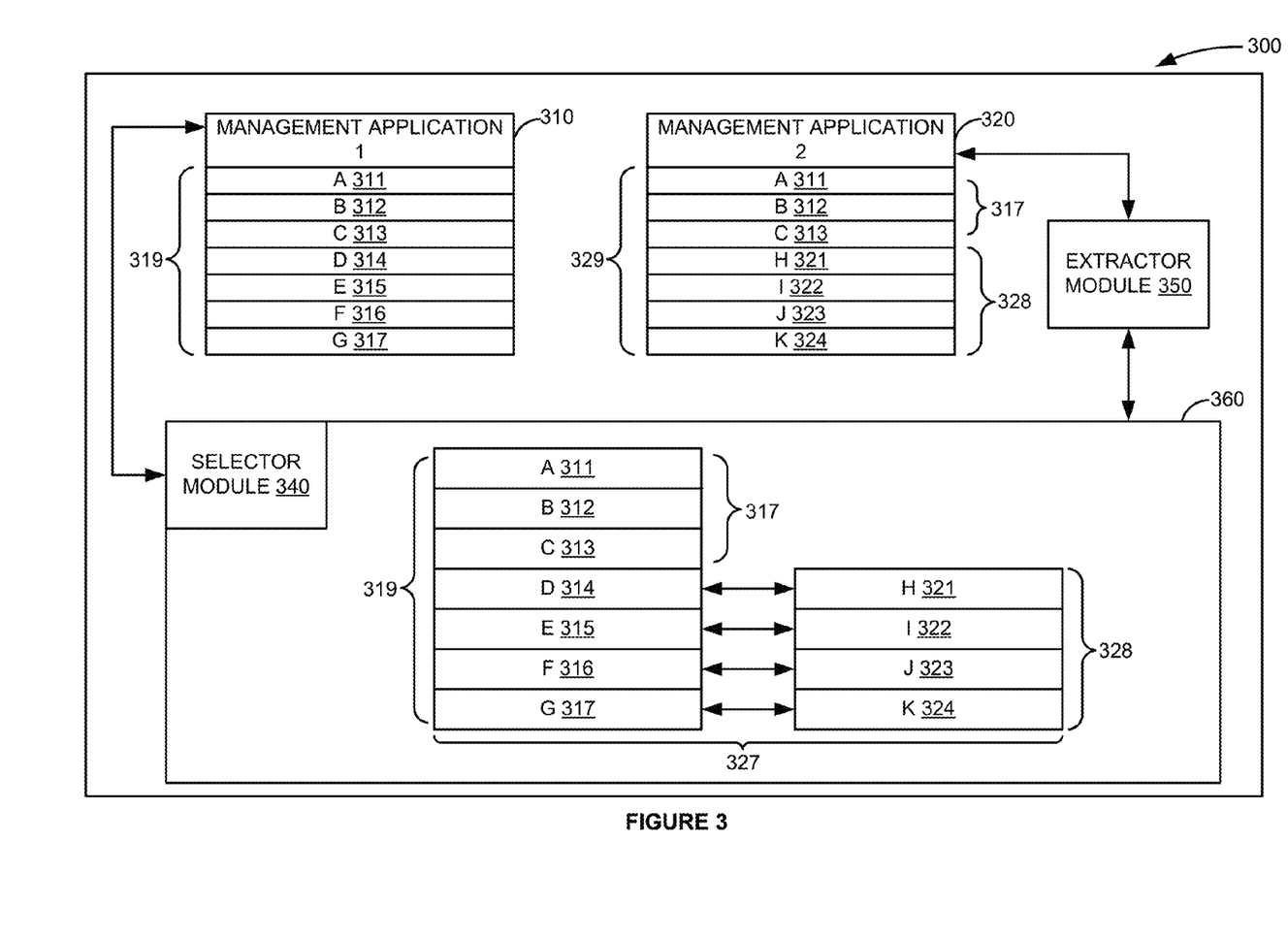
FIG. 3 is a block diagram of an embodiment of a system for automatic context passing during management application navigation with functionality to follow relations between different managed entities.

FIG. 3 is a block diagram 300 of an embodiment of a system for automatic context passing during management application with functionality to follow relations between different managed entities. The system 300 includes a first management application 310 and a second management application 320, one or more managed entities 319 a user works with in the first management application, and one or more managed entities 329 within the second management application 320.

When navigating between the first management application 310 and the second management application 320, the managed entities 319 for the first management application 310 and the managed entities 329 for the second management application 320 may not necessarily be of the same type. For instance, managed entities 311, 312, and 313 are recognizable and operable by both the management application 310 and the management application 320. However, managed entities 314, 315, 316, and 317 from management application 310 are not recognizable by the second management application 320. The same is true with managed entities 321, 322, 323, and 324, pertinent to management application 320 but not recognizable by management application 310.

The system 300 further includes a selector module 340 to define the one or more related entities 328 to the one or more managed entities 319 in the first management application 310, thus populating a managed entity context 327. The selector module 340 defines relations between entities: 314 to 321, 315 to 322, 316 to 323, and 317 to 324. The managed entities 319 plus their related entities 328 form the managed entity context 327.

The system 300 further includes an extractor module 350 to retrieve one or more context entities 317 and 328 from the managed entity context 327, the one or more context entities 317 and 328 recognizable by the second management application 320. Thus, when management applications 310 and 320 work with different management entities 319 and 329 accordingly (at least partially), the managed context will be preserved by following the relations between the managed entities 319 and their related entities 328, because the related entities 328 are recognizable by the second management application 320.

In one embodiment, the relations between the one or more managed entities 319 and the one or more related entities 328 are predefined in a mediator framework 360. The mediator framework 360 serves as a model for the relations between the managed entities 319 and their related entities 328. In one embodiment, the entity relations are formed by attributes and operations applicable for the managed entities 319.

In some embodiments the entity relations between the managed entities 319 and the related entities 328 are hard coded, while in other embodiments there is a user interface for adding these relations at runtime. In some embodiments, the mediator framework 360 is further used as a container for the first management application 310 and the second management application 320. In yet other embodiments, the mediator framework 360 includes an interface to the first management application 310 and the second management application 320, the interface to manage the lifecycle of the first management application 310 and the second management application 320. In some embodiments the system 300 further includes a display module to display the retrieved one or more context entities 317 and 328 in the second management application 320.

Figure 4A:
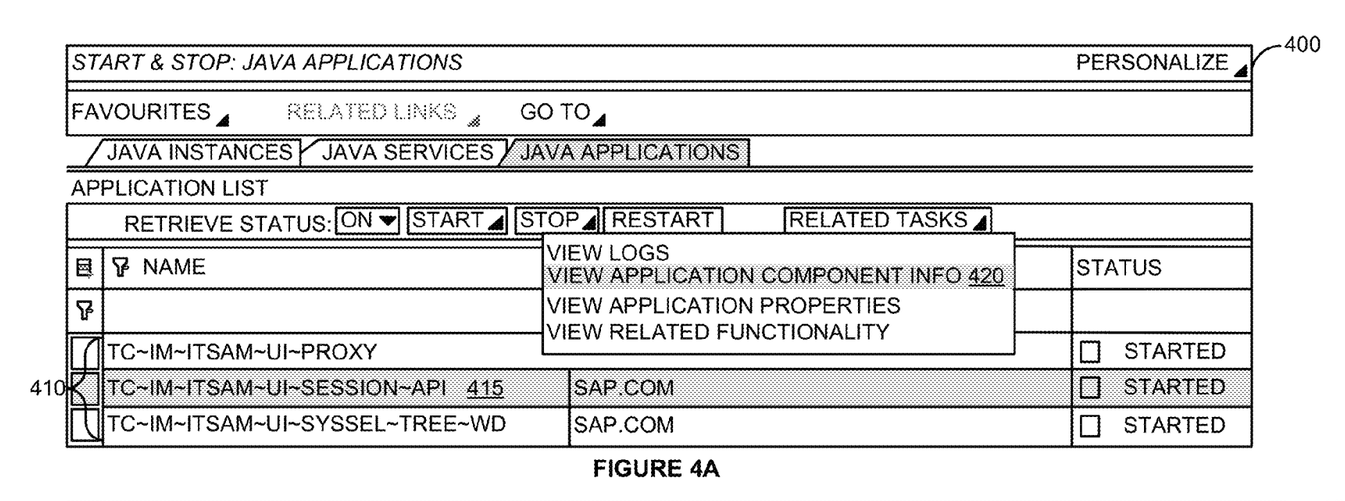
FIG. 4A is a graphical user interface diagram with an exemplary illustration of automatic context passing during management application navigation.
Figure 4B:
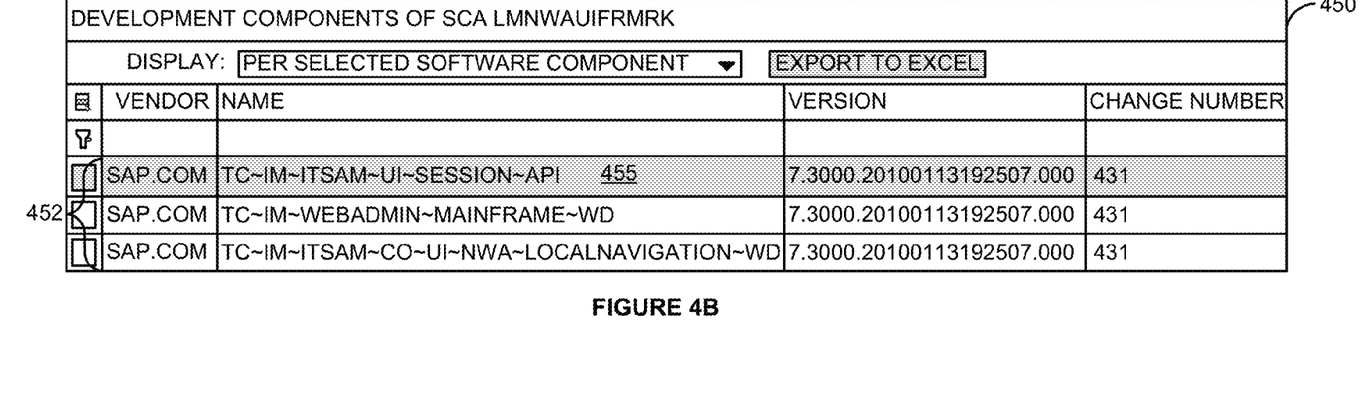
FIG. 4B is a graphical user interface diagram with an exemplary illustration of automatic context passing during management application navigation.

FIG. 4A and FIG. 4B are graphical user interface diagrams with an exemplary illustration of automatic context passing during management application navigation. The user scenario starts in "Start and Stop: Java Applications" user interface 400 in FIG. 4A. This user interface 400 represents a management application, where a user can see all java applications 410 running on the system.

The user can select one of these java applications 410 to see various details of the selected java application like, for example, deployed time, version, etc. The details of the java application 415 are shown in FIG. 4B in the "System Info: Components Info" management application 450. There is a link 420 in FIG. 4A within the management application 400 to load the management application 450 presented in FIG. 4B. If the user clicks on the link 420 in FIG. 4A, the management application 400 stores into a mediator framework 140, that the selected java application is the java application 415. Then, the mediator framework 140 accesses the MBean of this java application 415 and takes the MBeans of its related entities. There is one MBean of the related entities that is from application component type. This entity 455 in FIG. 4B has the same name as the java application 415 in FIG. 4A. The mediator framework 140 adds related entities to the managed context.

The mediator framework 140 then destroys the management application 400 presented in FIG. 4A and loads the management application 450 presented in FIG. 4B. Management application 450 works with managed entities 452 from application component type. It asks the mediator framework 140 for entities from application component type within the managed context. The mediator framework gives entity 455 as being within the managed context. The management application 450 loads all existing entities 452 and selects the entity 455. Thus the mediator framework 140 automatically follows the relation between java application 415 in FIG. 4A and entity 455 of FIG. 4B to preserve the managed context.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with machine readable software instructions.

Figure 5:
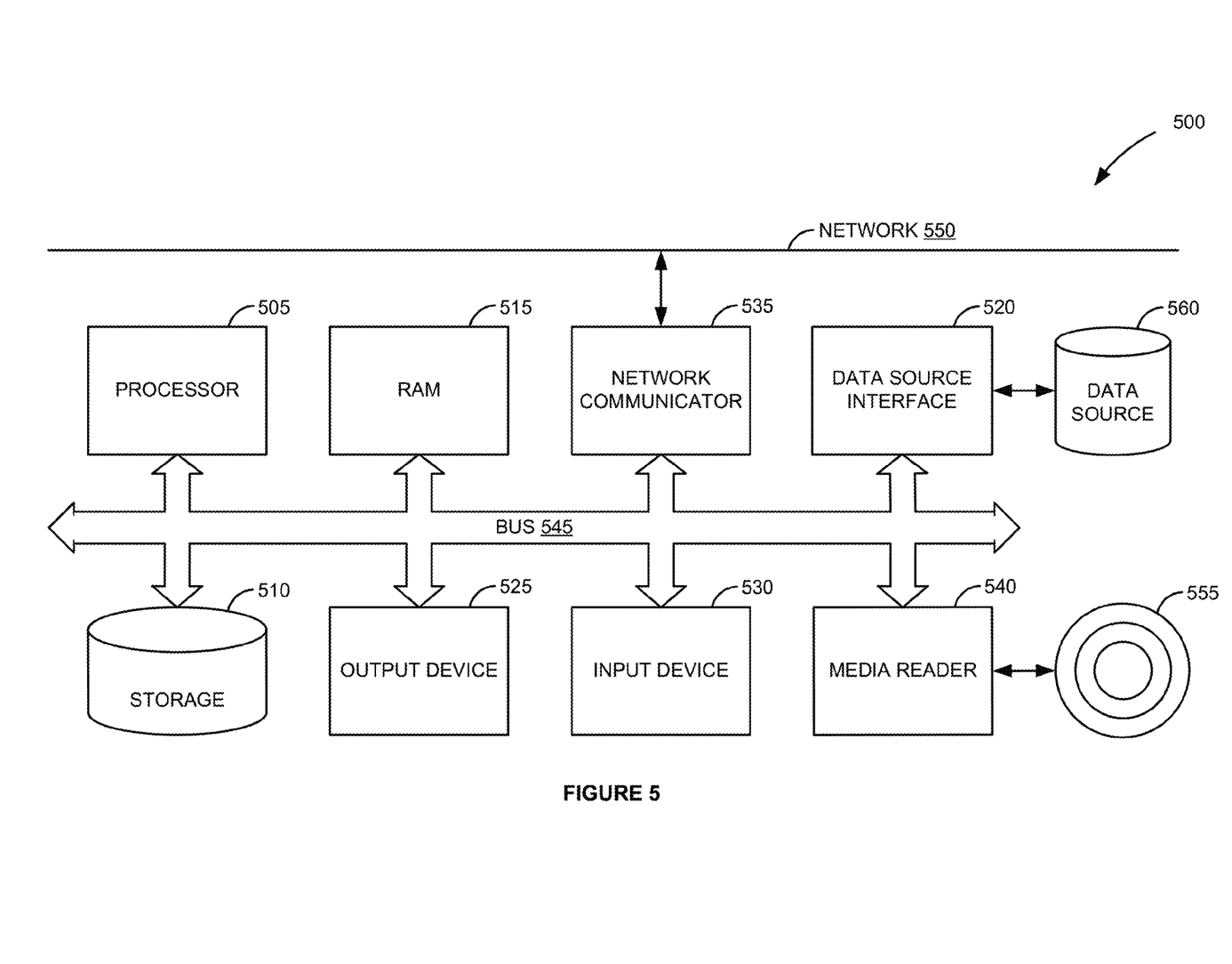
FIG. 5 is a block diagram illustrating a computing environment in which the techniques described for automatic context passing during management application navigation with functionality to follow relations between different managed entities can be implemented, according to an embodiment of the invention.

FIG. 5 is a block diagram of an exemplary computer system 500. The computer system 500 includes a processor 505 that executes software instructions or code stored on a computer readable storage medium 555 to perform the above-illustrated methods of the invention. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. The stored instructions may be further compiled to generate other representations of the instructions and dynamically stored in the RAM 515. The processor 505 reads instructions from the RAM 515 and performs actions as instructed. According to one embodiment of the invention, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:
receive a user action to navigate to a second management application from a first management application;
collect one or more managed entities in the first management application, wherein the one or more managed entities are at least one of an application and a service;
define one or more related entities, comprising entities related to the one or more managed entities to populate a managed entity context, wherein the one or more related entities are defined through entity relations registered by one or more dedicated managed beans (MBeans), the one or more dedicated MBeans comprising an attribute showing the entity relations;
retrieve one or more context entities from the managed entity context, the one or more context entities recognizable by the second management application; and
apply the retrieved one or more context entities in the second management application.

2. The article of manufacture of claim 1, wherein receiving the user action to navigate to a second management application is performed by following a link in the first management application leading to the second management application.

3. The article of manufacture of claim 1, wherein receiving the user action to navigate to a second management application is performed by exiting the first management application and loading the second management application.

4. The article of manufacture of claim 1, wherein the entity relations are added at runtime.

5. The article of manufacture of claim 1, storing further instructions, which when executed by a computer, cause the computer to display the applied one or more context entities in the second management application.

6. A computer implemented method for automatic context passing during navigation between management applications, the method comprising:
receiving a user action to navigate to a second management application from a first management application;
collecting one or more managed entities in the first management application, wherein the one or more managed entities are at least one of an application and a service;
a processor of the computer, defining one or more related entities, comprising entities related to the one or more managed entities to populate a managed entity context, wherein the one or more related entities are defined through entity relations registered by one or more dedicated managed beans (MBeans), the one or more dedicated MBeans comprising an attribute showing the entity relations;
the processor, retrieving one or more context entities from the managed entity context, the one or more context entities recognizable by the second management application; and
applying the retrieved one or more context entities in the second management application.

7. The method of claim 6, wherein receiving the user action to navigate to a second management application is performed by following a link in the first management application leading to the second management application.

8. The method of claim 6, wherein receiving the user action to navigate to a second management application is performed by exiting the first management application and loading the second management application.

9. The method of claim 6, wherein the entity relations are added at runtime.

10. The method of claim 6, further comprising displaying the applied one or more context entities in the second management application.

11. A computer system for automatic context passing during navigation between management applications, including at least one processor and memory for executing program code, the system comprising:
a first and a second management applications:
one or more managed entities in the first management application, wherein the one or more managed entities are at least one of an application and a service; and
one or more related entities, comprising entities related to the one or more managed entities;
a selector module to define the one or more related entities, comprising entities related to the one or more managed entities in the first management application to populate a managed entity context, wherein the one or more related entities are defined through entity relations registered by one or more dedicated managed beans (MBeans), the one or more dedicated MBeans comprising an attribute showing the entity relations; and
an extractor module to retrieve one or more context entities from the managed entity context, the one or more context entities recognizable by the second management application.

12. The system of claim 11, further comprising a mediator framework with entity relations between the one or more managed entities and the one or more related entities.

13. The system of claim 12, wherein the entity relations are formed by attributes and operations applicable for the managed entities.

14. The system of claim 12, wherein the entity relations are hard coded.

15. The system of claim 12, further comprising a user interface for adding the entity relations at runtime.

16. The system of claim 12, wherein the mediator framework is further used as a container for the first and the second management applications.

17. The system of claim 15, wherein the mediator framework further comprises an interface to the first and the second management applications to manage the lifecycle of the first and the second management applications.

18. The system of claim 11, further comprising a display module to display the retrieved one or more context entities.

* * * * *